United States Patent [19]

Aoike et al.

[11] Patent Number: 4,491,876
[45] Date of Patent: Jan. 1, 1985

[54] VIDEO RECORDING BY FREQUENCY MODULATION OF LUMINANCE AND MULTIPLEXED CHROMA COMPONENTS

[75] Inventors: Hitoshi Aoike, Nagareyama; Toyotaka Machida, Kashiwa; Toshimasa Kumazaki, Koshigaya; Kazuyuki Suenaga, Noda, all of Japan

[73] Assignee: Victor Company of Japan, Ltd., Japan

[21] Appl. No.: 418,818

[22] Filed: Sep. 15, 1982

[30] Foreign Application Priority Data

Sep. 16, 1981 [JP] Japan .................. 56-145983

[51] Int. Cl.³ .......................................... H04N 9/491
[52] U.S. Cl. ................................................ 358/330
[58] Field of Search ............................ 358/330, 310

[56] References Cited

U.S. PATENT DOCUMENTS 4,419,698 12/1983 Shiraishi et al. .................. 358/330

Primary Examiner—Richard Murray
Attorney, Agent, or Firm—Lowe, King, Price & Becker

[57] ABSTRACT

In a video recording system the chroma components of a color television signal are applied to a multiplexer where they are interleaved in frequency with each other so that the energy concentration of each chroma component occurs at frequencies interleaved with the frequencies at which the energy concentration of the other chroma component occurs. The interleaved chroma components and the luminance component are supplied respectively to frequency modulators each producing an output having energies distributed over the full range of the passband of the system. The outputs of the modulators are fed to first and second transducers for recording the luminance and chroma components on adjacent tracks of a recording medium.

6 Claims, 8 Drawing Figures

VIDEO RECORDING BY FREQUENCY MODULATION OF LUMINANCE AND MULTIPLEXED CHROMA COMPONENTS

BACKGROUND OF THE INVENTION

The present invention relates to recording and/or reproduction of color television signals, and in particular to a circuit for processing the color difference signals so that high quality images are obtained.

While different types of recording medium are currently available for recording color television signals, the usable passband is limited by a variety of factors which include the storage capacity of the recording medium and the performance of the transducer with which the signal is recorded and reproduced. Various attempts have hitherto been made for maximum utilization of the limited passband for recording color television signals which contain a large amount of information such as luminance and chrominance signal components.

The frequency bandwidth of conventional household video tape recorders is currently limited to about 6 MHz which is determined by the head gap and the relative speed of tape thereto. According to one prior art recording format, the color difference components are converted to a lower frequency range of the 6-MHz band and the luminance component is modulated in frequency upon a 3.9 MHz carrier so that the lower sideband of the modulated luminance lies in the range of 1.4 MHz to 3.9 MHz. When transcribing a video tape, the signal reproduced from the tape is amplified prior to being recorded on a second tape to a sufficient level to ensure against noise. However, the reproduced signal needs to be separated by the use of filters for linear amplification of the chroma signal and for nonlinear amplification of the frequency-modulated luminance component to a predetermined saturation level.

One disadvantage of the prior art system is that no separation filters having ideal passband characteristics are currently available, so that the transcribed signal is not exactly the replica of the original signal.

SUMMARY OF THE INVENTION

The present invention eliminates the shortcomings of the prior art system by multiplexing the color difference components in frequency so that the energy of each color difference component concentrates at frequencies which are interleaved with the frequencies at which the energy of the other color difference component concentrates and modulating the multiplexed signal in frequency. The luminance component is also frequency modulated and applied to a first transducer and the frequency modulated, multiplexed color difference signal is applied to a second transducer.

According to a feature of the invention, each of the frequency modulated signals has an energy distribution which spreads substantially over the full frequency range of the spectrum.

According to a first aspect of the invention, there is provided a video recording system adapted for recording a color television signal having a luminance component and color difference components on a recording medium, comprising multiplexer means for multiplexing the color difference components in frequency so that each of the color difference components concentrates its energy at frequencies which are interleaved with the frequencies at which the energy of the other color difference component is concentrated, first frequency modulator means for modulating the luminance component to provide an output having upper and lower sidebands spreading substantially over the full range of the passband of the recording system, second frequency modulator means for modulating the multiplexed color difference components to provide an output having upper and lower sidebands spreading substantially over the full range of the passband, and first and second transducers respectively coupled to the first and second frequency modulator means and associated with the recording medium.

According to another aspect of the invention, there is provided a video recording and reproducing system adapted for recording a color television signal having a luminance component and color difference components on a recording medium and reproducing the recorded signal, comprising, multiplexer means for multiplexing the color difference components in frequency so that the each of the color difference components concentrates its energy at frequencies which are interleaved with the frequencies at which the energy of the other color difference component is concentrated, first frequency modulator means for modulating the luminance component to provide an output having upper and lower sidebands spreading substantially over the full range of the passband of the recording and reproduction system, second frequency modulator means for modulating the multiplexed color difference components to provide an output having upper and lower sidebands spreading substantially over the full range of the passband, first and second transducers associated with the recording medium, first and second frequency demodulator means, switch means for selectively coupling the outputs of the first and second frequency modulator means to the first and second transducers respectively when the system is in a recording mode and coupling the inputs of the first and second frequency demodulator means to the first and second transducers respectively when the system is in a playback mode, and demultiplexer means for demultiplexing the output of the second frequency demodulator means to recover the original color difference components.

BRIEF DESCRIPTION OF THE DRAWINGS

The present invention will be described in further detail with reference to the accompanying drawings, in which.

DETAILED DESCRIPTION

Figure 1:
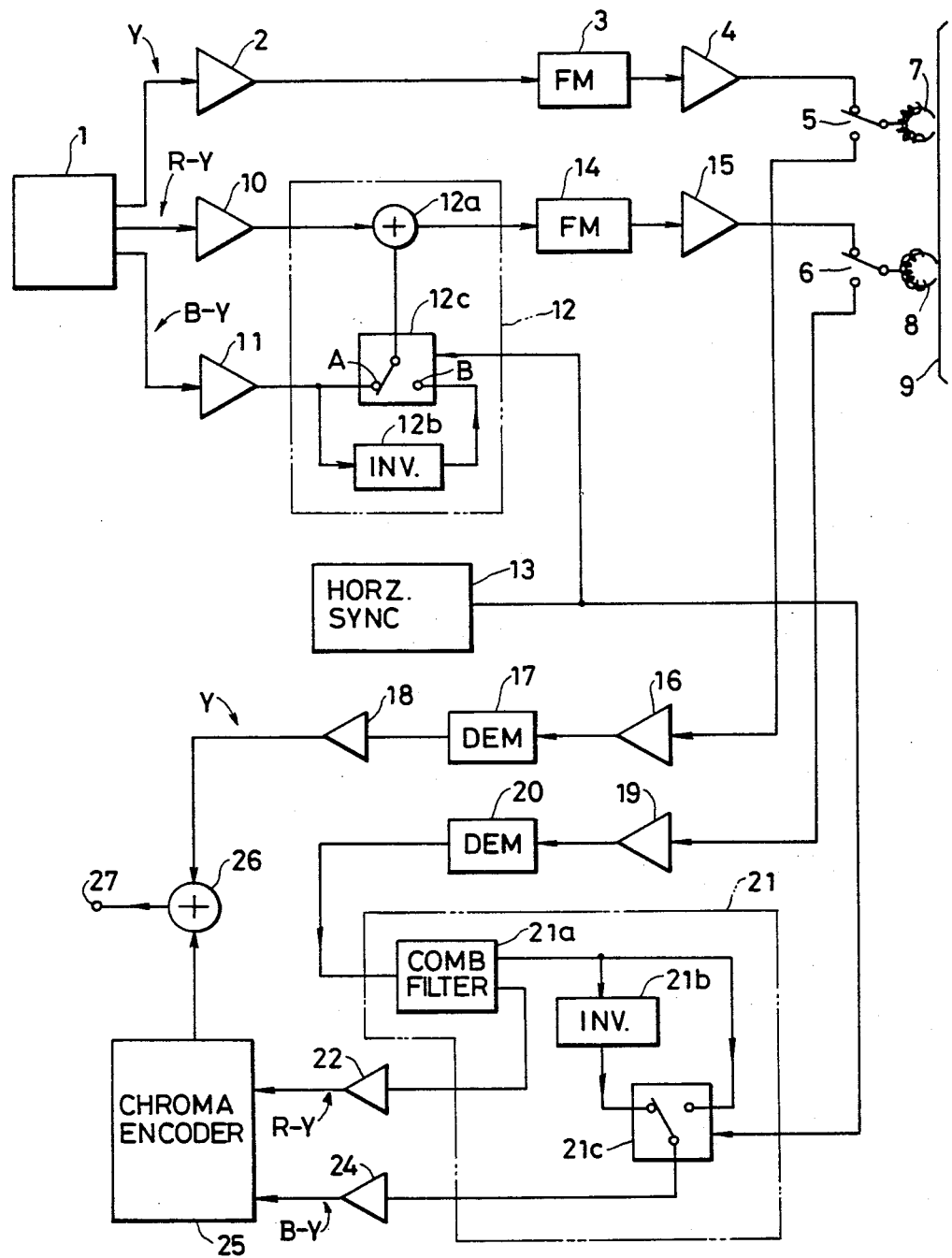
FIG. 1 is a block diagram of a preferred embodiment of the present invention.

Referring to FIG. 1, a color television signal comprising a luminance component Y and color difference components R-Y and B-Y is generated by a source 1 according to a well known manner.

Figure 2A:
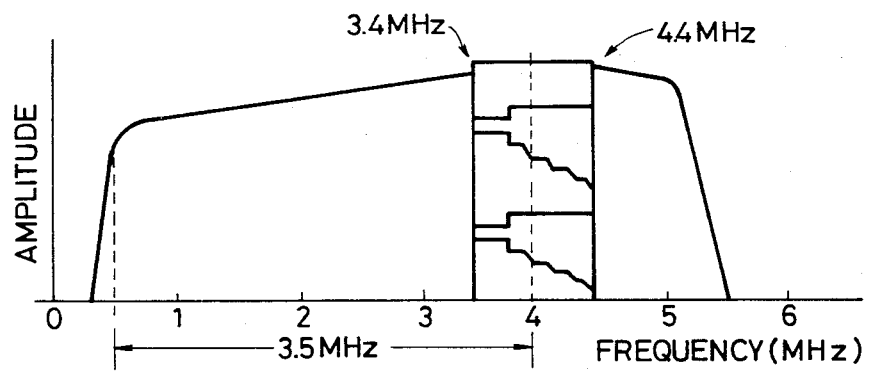
FIGS. 2a and 2b are illustrations of the energy distribution of the frequency modulated luminance and chroma signal components.

The luminance component Y is applied through an amplifier 2 to a frequency modulator 3 where it is modulated upon a 3.9 MHz carrier so that white peak and sync tip corresponds respectively to 4.4 MHz and 3.4 MHz and the upper and sidebands spread substantially over the full range of the passband of the system as illustrated in FIG. 2a.

Figure 3:
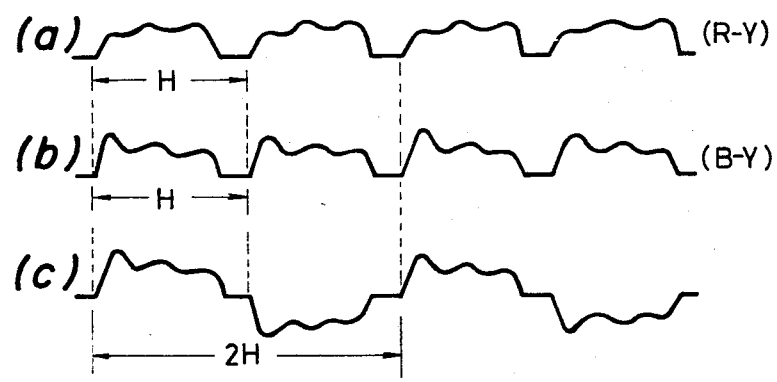
FIG. 3 is a waveform diagram showing waveforms of color difference components prior to their being frequency multiplexed.

The color difference components R-Y and B-Y are applied through amplifiers 10 and 11 to a frequency multiplexer 12. This multiplexer comprises an adder 12a, an inverter 12b and an electronic analog switch 12c. The amplified R-Y component is applied to an input of the adder 12a and the amplified B-Y component is applied to the contact A of switch 12c and to the input of inverter 12b the output of which is coupled to the contact B of switch 12c, the moving contact of switch 12c being coupled to another input of the adder 12a. The switch 12c is responsive to a horizontal sync pulse supplied from a sync source 13 so that the polarity of the B-Y component applied to the adder 12a is inverted during an alternately occurring horizontal scan interval as shown in FIG. 3c.

Figure 2B:
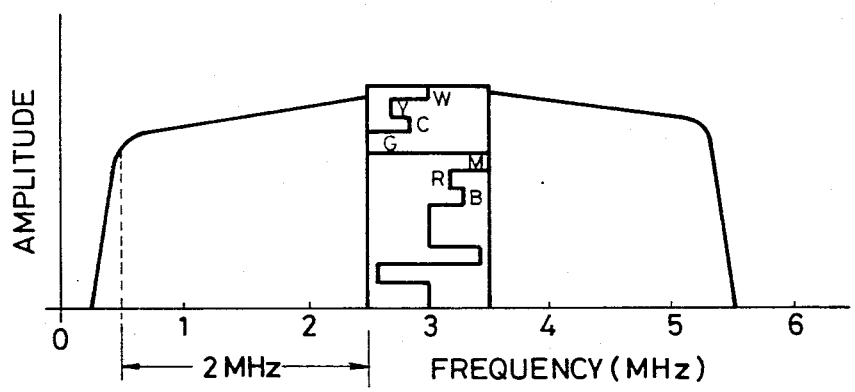
Figure 4:
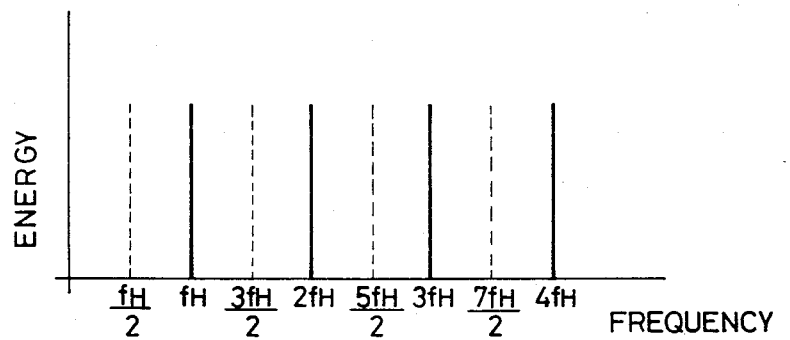
FIG. 4 is an illustration of a Fourier analysis of the multiplexed color difference components.

The two color difference components are combined in the adder 12a and fed to a frequency modulator 14. Since it is known that the color difference signals on adjacent horizontal lines have a high degree of correlation in intelligence with each other, the output of switch 12c tends to repeat at two horizontal scan intervals as shown in FIG. 3c and is therefore variable as a function of time as represented by $f(t+H)=-f(t)$, where t is time and H is the horizontal scan interval. Therefore, Fourier analysis of the chroma components reveals that the energy of the R-Y component concentrates at frequencies which are spaced at integral multiples of the horizontal line frequency and the energy of the B-Y signal concentrates at frequencies which are spaced at odd-number multiples of one-half the horizontal line frequency. Thus, the R-Y signal is interleaved in frequency with the B-Y signal as indicated by solid and broken lines respectively in FIG. 4. The interleaved color difference components are applied to a frequency modulator 14 to modulate on a 3-MHz carrier, the modulated color difference components being amplified by an amplifier 15. As illustrated in FIG. 2b, the frequency-modulated, interleaved signal has an energy distribution which spreads substantially over the full frequency spectrum of the passband.

The system includes a pair of ganged switches 5 and 6 for coupling the outputs of the frequency modulators 3 and 14 to transducer heads 7 and 8 when the system is in a record mode.

Figure 5:
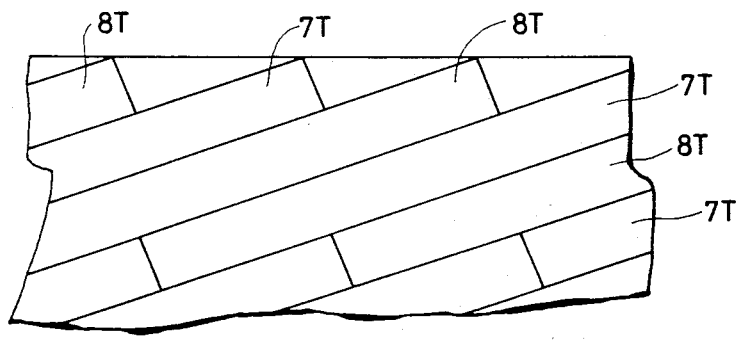
FIG. 5 is an illustration of a recording pattern according to the invention.

The luminance and color difference components are recorded respectively on skewed adjacent tracks 7T and 8T as shown in FIG. 5. In this way, the recorded color television signal utilizes the passband of the system to the fullest extent.

When the system is switched to a playback mode the switches 5 and 6 are transferred to couple the transducers 7 and 8 to the playback section of the system. The luminance component detected by the head 7 is applied through a preamplifier 16 to a frequency demodulator 17 to recover the original luminance signal which is then coupled by an amplifier 18 to an input of an adder 26.

Figure 6:
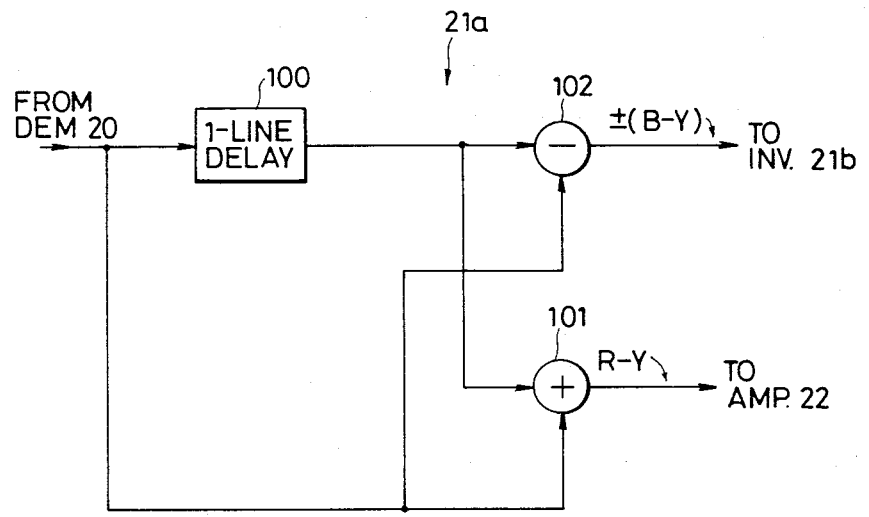
FIG. 6 is a block diagram of a typical comb filter.
Figure 7:
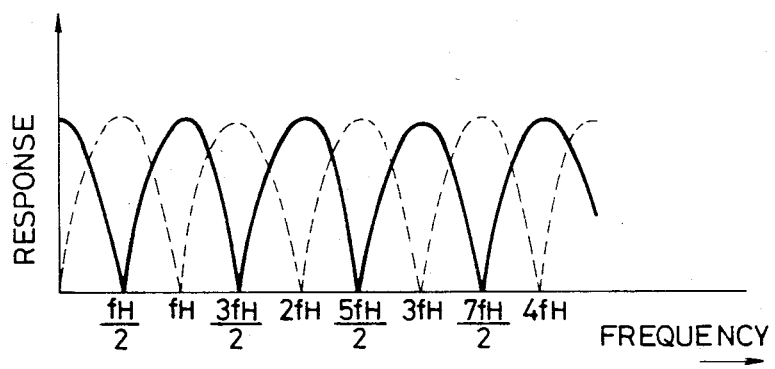
FIG. 7 is an illustration of the characteristics of the comb filter of FIG. 6.

The recorded color difference components are detected by the head 8 and applied through a preamplifier 19 to a frequency demodulator 20 to recover the frequency multiplexed chroma components, and thence to a frequency demultiplexer 21 whose function is inverse to the function of the multiplexer 12. This demultiplexer comprises a comb filter 21a, an inverter 21b and an electronic analog switch 21c. As illustrated in FIG. 6 the comb filter 21a comprises a 1-line delay circuit 100 which takes its input from the frequency demodulator 20, an adder 101 and a subtractor 102 each having a first input coupled to the output of 1-line delay circuit 100 and a second input coupled to the output of frequency demodulator 20. The delayed and non-delayed B-Y components are of opposite polarities to each other, and nullified in the adder 101 and the delay and non-delayed R-Y components are of equal polarities, and add up to produce an output. Whereas, in the subtractor 102 the delayed and non-delayed R-Y components of equal polarities are nullified and the delayed and non-delayed B-Y components of opposite polarities add up to produce an output. Thus, the adder 101 provides an R-Y component which is the replica of the signal applied to one input of the adder 12a of the multiplexer 12 and the subtractor 102 provides a sequence of B-Y components which changes in polarity at each horizontal scan as a replica of the signal applied to the other input of the adder 12a. FIG. 7 is an illustration of the passband characteristics of the comb filter 21 in which the solid line curve indicates the R-Y component delivered from adder 101 and the broken line curve indicates the ±(B-Y) component delivered from subtractor 102.

The R-Y component from the comb filter 21a is applied through an amplifier 22 to a conventional chroma encoder 25 and the ±(B-Y) component is applied to the inverter 21b where its polarity is reversed. The switch 21c is responsive to the horizontal sync pulse supplied from the source 13 to alternately couple the input and output of the inverter 21b to an amplifier 24 to provide an output having the same polarity for application to the chroma encoder 25.

The output of chroma encoder 25 is combined in the adder 26 with the luminance signal and sync pulses to produce a composite color television signal to be delivered to an output terminal 27.

When transcribing the video tape 9, the signals to be transcribed may be obtained from the outputs of amplifiers 16 and 19.

While mention has been made of a video tape recorder, the concept of the present invention could equally be applied to optical recording systems and capacitance disc recording systems as well.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A video recording system adapted for recording a color television signal having a luminance component and color difference components on a recording medium, comprising:

multiplexer means for multiplexing said color difference components in frequency so that each of the color difference components concentrates its energy at frequencies which are interleaved with the frequencies at which the energy of the other color difference component is concentrated;

first frequency modulator means for modulating said luminance component to provide an output having upper and lower sidebands spreading substantially over the full range of the passband of said recording system;

second frequency modulator means for modulating said multiplexed color difference components to provide an output having upper and lower sidebands spreading substantially over the full range of said passband; and first and second transducers respectively coupled to said first and second frequency modulator means and associated with said recording medium.

2. A video recording system as claimed in claim 1, wherein said multiplexer means comprises:

inverter means for inverting the polarity of one of said color difference components during an alternately occurring horizontal scan interval; and means for combining said inverted color difference component with the other color difference component.

3. A video recording and reproducing system adapted for recording a color television signal having a luminance component and color difference components on a recording medium and reproducing the recorded signal, comprising:

multiplexer means for multiplexing said color difference components in frequency so that each of the color difference components concentrates its energy at frequencies which are interleaved with the energy of the other color difference component is concentrated;

first frequency modulator means for modulating said luminance component to provide an output having upper and lower sidebands spreading substantially over the full range of the passband of said recording and reproduction system;

second frequency modulator means for modulating said multiplexed color difference components to provide an output having upper and lower sidebands spreading substantially over the full range of said passband;

first and second transducers associated with said recording medium;

first and second frequency demodulator means;

switch means for selectively coupling the outputs of said first and second frequency modulator means to said first and second transducers respectively when the system is in a recording mode and coupling the inputs of said first and second frequency demodulator means to said first and second transducers respectively when the system is in a playback mode; and demultiplexer means for demultiplexing the output of said second frequency demodulator means to recover the original color difference components.

4. A video recording and reproducing system as claimed in claim 3, wherein said multiplexer means comprises:

means for inverting the polarity of one of said color difference components during an alternately occurring horizontal scan interval; and means for combining said inverted color difference component with the other color difference component, and wherein said demultiplexer means comprises:

comb filter means coupled to said second demodulator means for separating the output of said second frequency demodulator means into color difference components identical to the color difference components combined in said combining means; and means for inverting the polarity of one of said color difference components during an alternately occurring horizontal scan interval.

5. A video reproducing system adapted for reproducing a color television signal having a luminance component and color difference components from a recording medium on which said luminance component is recorded as a frequency demodulated signal along a first track and said color difference components are recorded as a frequency modulated, frequency-interleaved signal along a second track adjacent to said first track, comprising:

first and second transducers for detecting signals from said first and second tracks respectively;

first and second frequency demodulator means connected respectively to said first and second transducers; and demultiplexer means for demultiplexing the output of said second frequency demodulator means to recover the original color difference components.

6. A video reproducing system as claimed in claim 5, characterized in that said demultiplexer means comprises comb filter means coupled to said second demodulator means for separating the output of said second frequency demodulator means into color difference components, and means for inverting the polarity of one of said color difference components during an alternately occurring horizontal scan interval.

* * * * *